US008676474B2

(12) United States Patent
Peterson et al.

(10) Patent No.: US 8,676,474 B2
(45) Date of Patent: Mar. 18, 2014

(54) MACHINE CONTROL SYSTEM AND METHOD

(75) Inventors: Grant S. Peterson, Metamora, IL (US); Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 413 days.

(21) Appl. No.: 12/982,696

(22) Filed: Dec. 30, 2010

(65) Prior Publication Data

US 2012/0173005 A1 Jul. 5, 2012

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC .................. 701/104; 701/101; 701/50; 701/1; 701/110; 701/102

(58) Field of Classification Search
USPC .................. 60/445
See application file for complete search history.

(56) References Cited

U.S. PATENT DOCUMENTS

| | | | | | |
|---|---|---|---|---|---|
| 4,319,327 | A * | 3/1982 | Higashiyama et al. | 701/104 |
| 4,387,681 | A * | 6/1983 | Ikeura et al. | 123/325 |
| 4,542,802 | A | 9/1985 | Garvey et al. | |
| 4,721,083 | A * | 1/1988 | Hosaka | 477/111 |
| 4,914,597 | A * | 4/1990 | Moncelle et al. | 701/95 |
| 4,955,344 | A * | 9/1990 | Tatsumi et al. | 123/352 |
| 5,010,863 | A * | 4/1991 | Ishida et al. | 123/179.18 |
| 5,386,698 | A * | 2/1995 | Kamel | 60/603 |
| 5,429,089 | A * | 7/1995 | Thornberg et al. | 123/352 |
| 5,484,351 | A * | 1/1996 | Zhang et al. | 477/113 |
| 5,549,096 | A * | 8/1996 | Swenson et al. | 123/564 |
| 5,553,589 | A * | 9/1996 | Middleton et al. | 123/352 |
| 5,638,677 | A * | 6/1997 | Hosono et al. | 60/431 |
| 5,868,214 | A * | 2/1999 | Workman | 180/179 |
| 5,890,470 | A | 4/1999 | Woon et al. | |
| 5,967,756 | A | 10/1999 | Devier et al. | |
| 5,974,796 | A * | 11/1999 | Ishikawa et al. | 60/399 |
| 6,042,505 | A * | 3/2000 | Bellinger | 477/111 |
| 6,089,207 | A * | 7/2000 | Goode et al. | 123/357 |
| 6,092,504 | A * | 7/2000 | Barnes et al. | 123/357 |
| 6,167,979 | B1 * | 1/2001 | Taylor et al. | 180/170 |
| 6,196,188 | B1 * | 3/2001 | Janic et al. | 123/350 |
| 6,220,987 | B1 * | 4/2001 | Robichaux et al. | 477/97 |
| 6,248,041 | B1 * | 6/2001 | Den Besten | 477/110 |
| 6,259,986 | B1 * | 7/2001 | Kotwicki | 701/101 |
| 6,387,011 | B1 * | 5/2002 | Bellinger | 477/111 |

(Continued)

FOREIGN PATENT DOCUMENTS

| | | |
|---|---|---|
| EP | 0558765 | 9/1993 |
| EP | 2090700 | 8/2009 |

*Primary Examiner* — Bhavesh V Amin

(74) *Attorney, Agent, or Firm* — Finnegan, Henderson, Farabow, Garrett & Dunner LLP; Jeff A. Greene

(57) ABSTRACT

A control system for a machine may include a processor configured to communicate with a power source. The processor may also be configured to communicate with a transmission assembly. The processor may be configured to determine whether the power source is in a potential stall condition based at least in part on an actual speed of the power source and a requested speed of the power source. If the power source is in the potential stall condition, the processor may be configured to request that fuel be supplied to the power source although the fuel is not currently required by the power source, in anticipation of an increase in load on the machine.

20 Claims, 7 Drawing Sheets

(56) References Cited

U.S. PATENT DOCUMENTS

| | | | | |
|---|---|---|---|---|
| 6,436,005 | B1 * | 8/2002 | Bellinger | 477/111 |
| 6,460,421 | B1 * | 10/2002 | Hasegawa et al. | 73/862.29 |
| 6,546,329 | B2 * | 4/2003 | Bellinger | 701/115 |
| 6,564,774 | B2 * | 5/2003 | Ellims et al. | 123/352 |
| 6,655,351 | B2 | 12/2003 | Sheidler et al. | |
| 6,675,577 | B2 * | 1/2004 | Evans | 60/445 |
| 6,782,868 | B1 * | 8/2004 | Doering | 123/333 |
| 6,825,576 | B1 * | 11/2004 | Blackburn et al. | 290/40 A |
| 6,839,619 | B2 * | 1/2005 | Bellinger | 701/103 |
| 6,868,328 | B2 * | 3/2005 | Fulton | 701/104 |
| 6,944,532 | B2 * | 9/2005 | Bellinger | 701/115 |
| 6,959,241 | B2 * | 10/2005 | Itow et al. | 701/102 |
| 6,964,261 | B2 * | 11/2005 | Warne et al. | 123/436 |
| 7,047,938 | B2 * | 5/2006 | Flynn et al. | 123/352 |
| 7,210,293 | B2 | 5/2007 | Fukasawa et al. | |
| 7,469,534 | B2 * | 12/2008 | Nishi et al. | 60/428 |
| 8,175,790 | B2 * | 5/2012 | Stemler et al. | 701/110 |
| 2007/0099757 | A1 * | 5/2007 | Landes | 477/175 |
| 2007/0219703 | A1 | 9/2007 | Wagner et al. | |
| 2008/0018271 | A1 | 1/2008 | Morinaga et al. | |
| 2009/0082929 | A1 | 3/2009 | Kendrick | |
| 2010/0174456 | A1 | 7/2010 | Beaudoin et al. | |

* cited by examiner

MACHINE CONTROL SYSTEM AND METHOD

TECHNICAL FIELD

This disclosure relates generally to a control system for a machine, and more particularly, to a feed-forward control system and method.

BACKGROUND

A machine including, for example, a loader, a tractor, or other type of heavy machinery, may be used for performing a variety of tasks. An operator may use an operator interface to control components of the machine. The machine may also include a control system to assist with controlling machine components. Machine components may include, for example, an engine for generating power, a traction assembly configured to propel the machine using power from the engine, a transmission assembly configured to transfer power from the engine to the traction assembly, and an implement assembly for engaging materials.

In some machines, during deceleration, the power source may be driven by the traction assembly through the transmission assembly. When this happens, the power source may be driven above a desired speed by the traction assembly, through the transmission assembly. Because the power source speed is above the desired speed, a governor associated with the power source may attempt to drive the power source speed to the desired speed by cutting fuel supply to the power source. With no fuel, the power source will not produce output. If the machine encounters a load, such as a grade, pile, and/or an obstacle, during such a zero fuel condition, the power source may stall.

The disclosed machine control system and method is directed at overcoming one or more of the problems set forth above, as well as other problems known in the art.

SUMMARY

According to one aspect of the present disclosure, a control system for a machine may include a processor configured to communicate with a power source. The processor may also be configured to communicate with a transmission assembly. The processor may be configured to determine whether the power source is in a potential stall condition based at least in part on an actual speed of the power source and a requested speed of the power source. If the power source is in the potential stall condition, the processor may be configured to request that fuel be supplied to the power source although the fuel is not currently required by the power source, in anticipation of an increase in load on the machine According to another aspect of the present disclosure, a method for controlling a machine including a power source and a transmission assembly may include determining whether the power source is in a potential stall condition based on an actual speed of the power source and a requested speed of the power source. The method may also include, if the power source is in the potential stall condition, determining whether a requested transmission assembly torque is increasing. The method may further include informing the power source that a load is coming based at least in part on the requested transmission assembly torque to prepare the power source for the oncoming load, in anticipation of the oncoming load.

According to yet another aspect of the present disclosure, a machine may include a power source. The machine may also include a governor configured to control power source fueling based on an actual speed of the power source and a requested speed of the power source. The machine may further include a transmission assembly operatively coupled to the power source. The machine may also include a control system operatively coupled to the power source and the transmission assembly. The control system may be configured to determine whether the power source is in a potential stall condition due to a response of the governor to a difference between the actual power source speed and the requested power source speed. The control system may also be configured to request that fuel be supplied to the power source to remedy the potential condition in anticipation of an increase in load on the machine.

DETAILED DESCRIPTION

The present disclosure is used in a machine. In the embodiment described below, a wheel loader machine 10 is disclosed. However, it can be appreciated that other types of machines can benefit from the embodiments disclosed herein, including, for example, any type of ground-borne vehicle, such as an automobile, a truck, an agricultural vehicle, and/or a construction vehicle, such as, a track loader, a dozer, a tractor, an excavator, a grader, an on-highway truck, an off-highway truck, and/or any type of machine known to persons skilled in the art.

Figure 1:
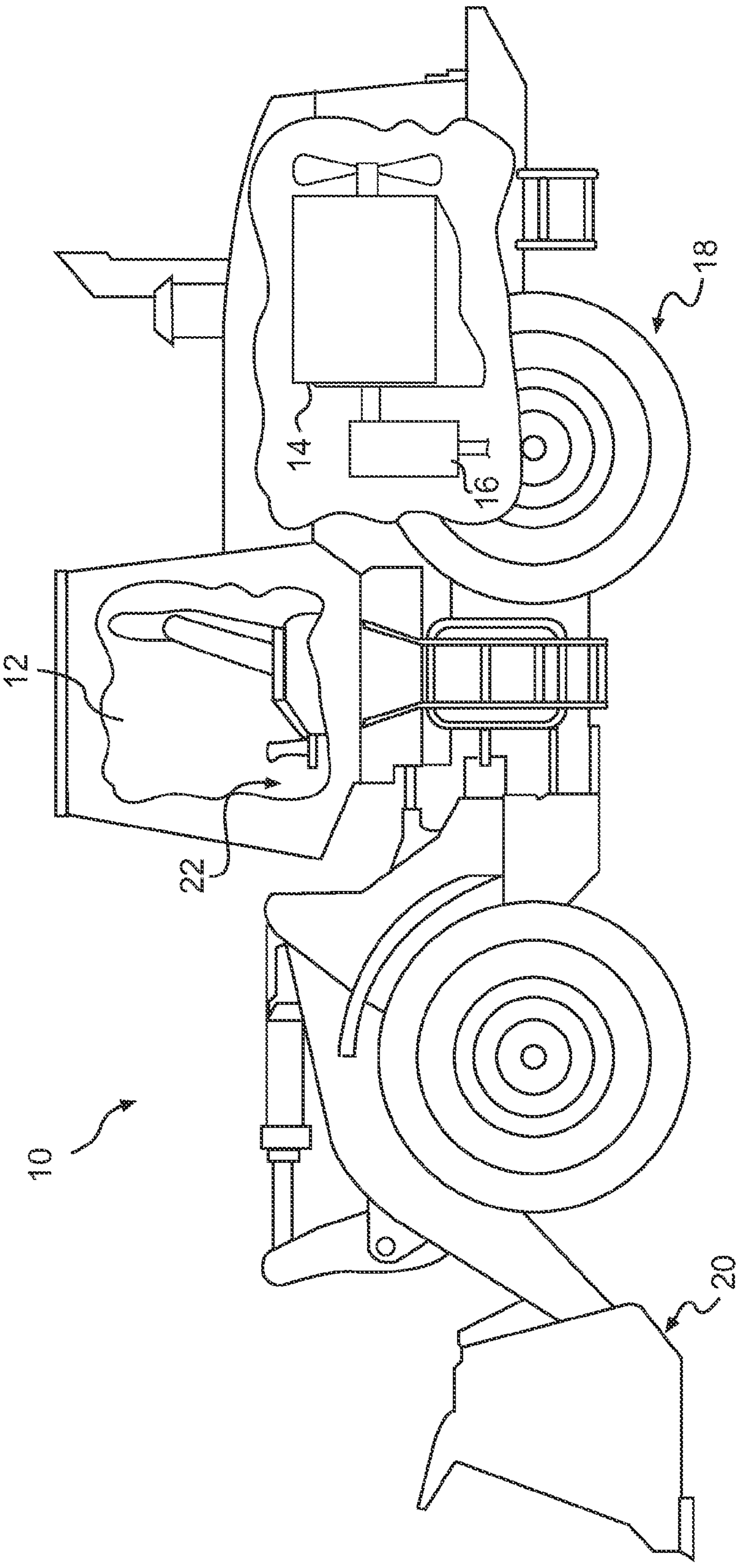
FIG. 1 is an illustration of an exemplary machine according to one aspect of the disclosure.

As shown in FIG. 1, machine 10 includes an operator station 12, a power source 14, a transmission assembly 16, a traction assembly 18, an implement assembly 20, as well as other machine components known to persons skilled in the art. Each of these machine components will now be described.

Figure 2:
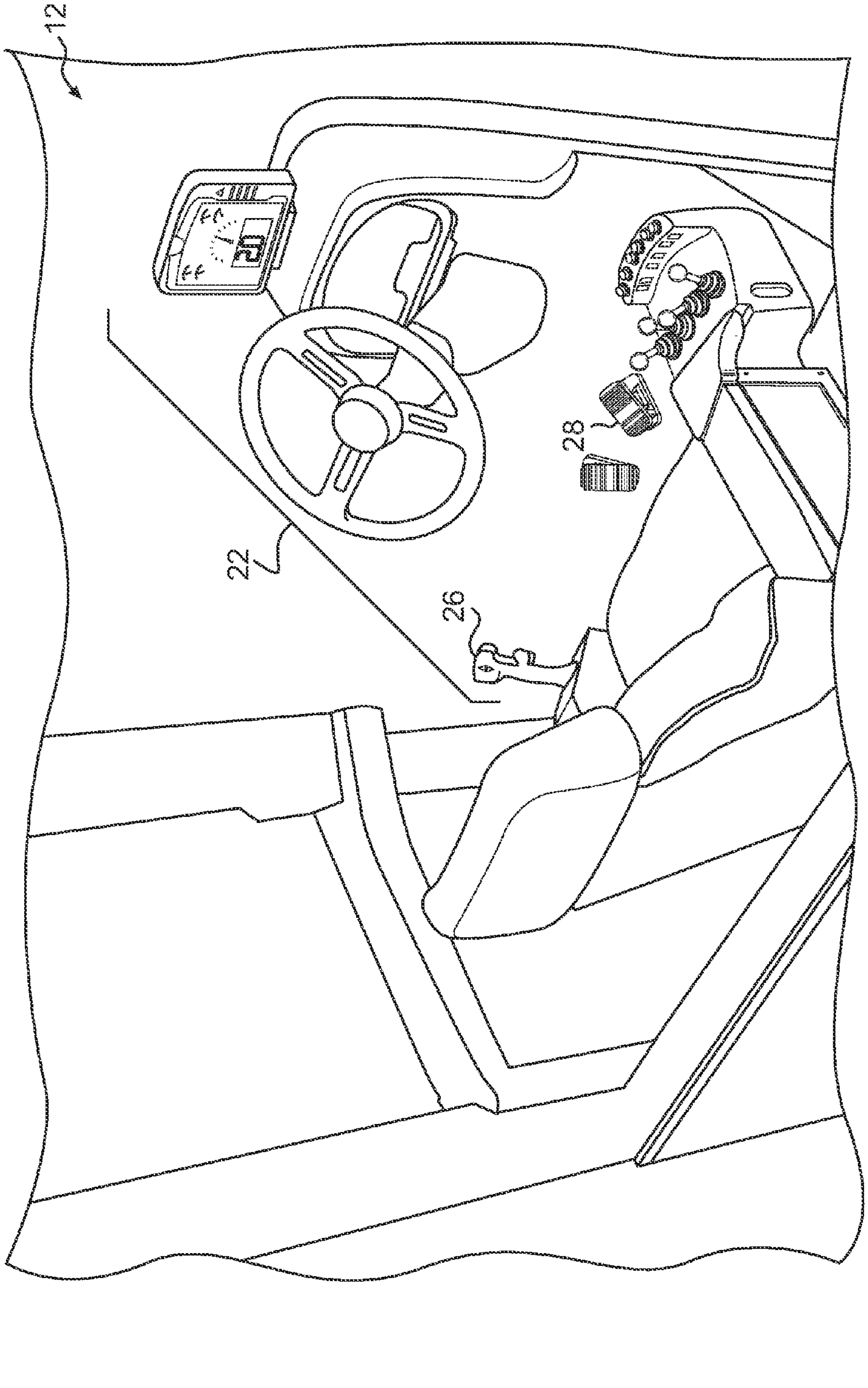
FIG. 2 is a perspective view of the inside of an operator station according to one aspect of the present disclosure.

As illustrated in FIG. 2, operator station 12 includes an operator interface 22. Operator interface 22 includes devices capable of being manipulated by a machine operator to produce signals, requests, and/or commands that are indicative of desired machine travel, maneuvers, and/or control. In one embodiment, operator interface 22 includes a joystick control 26, an acceleration or throttle pedal 28. It should be understood that any other control devices known to persons skilled in the art may be included in operator interface 22. The position of acceleration pedal 28 provides an indication of a power source speed that is desired or requested by the operator. As the operator manipulates acceleration pedal 28 by, for example, applying pressure, the operator may expect and effect a corresponding increase in the power source speed, and thus, an increase in the propulsion or travel of machine 10. As the operator releases the acceleration pedal 28, a decrease in the power source speed may be expected and effected, and thus, a corresponding decrease in the propulsion or travel of machine 10 may be expected and effected.

Figure 3:
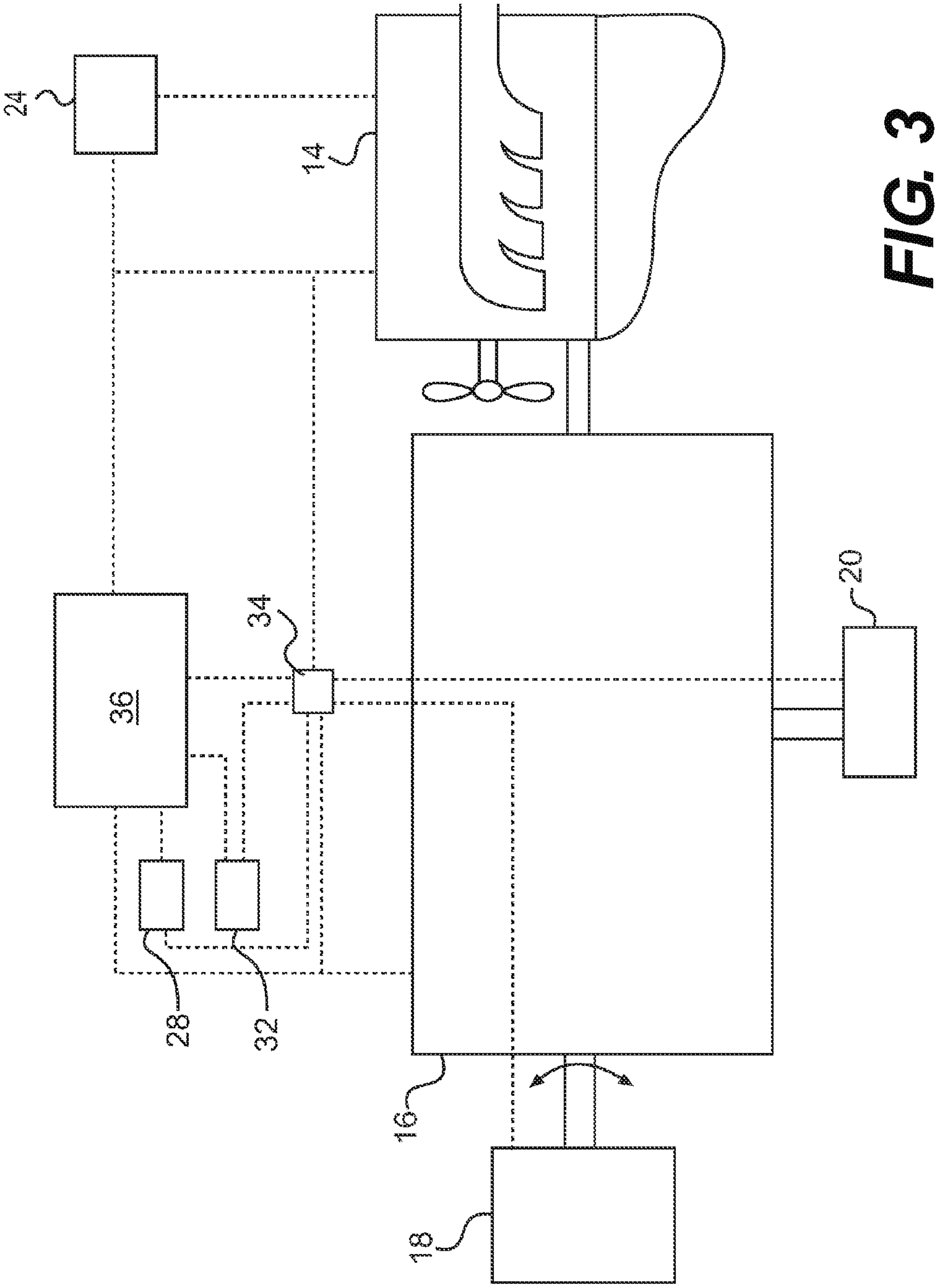
FIG. 3 is a schematic drawing of a power train and powered components according to one aspect of the present disclosure.

Referring to FIG. 3, during "normal" operation, fuel supply to power source 14 may be controlled by a governor 24 operatively coupled to power source 14. Governor 24 may increase fuel supply to power source 14 to bring the actual power source speed up to the requested power source speed if the actual power source speed is lower than the requested power source speed, and may decrease fuel supply to power source 14 to bring the actual power source speed down to the requested power source speed if the actual power source speed is higher than the requested power source speed. Basically, governor 24 attempts to keep the actual power source speed at or within a predetermined range of the requested power source speed, under "normal" operation.

Power source 14 may include, for example, an internal combustion engine, including but not limited to a spark-ignition engine, a compression ignition engine, a rotary engine, a gas turbine engine, and/or an engine powered by gasoline, diesel fuel, bio-diesel, ethanol, methanol, and combinations thereof. Power source 14 may also include a hydrogen-powered engine, a fuel cell, a solar cell, and/or any other power source known to persons skilled in the art.

Power source 14 and transmission assembly 16 are operatively coupled, and together form a power train. Transmission assembly 16 may include any transmission assembly that can back drive power source 14. Back driving may occur when machine 10 is decelerating and traction assembly 18 provides power to power source 14 via transmission assembly 16. For example, transmission assembly 16 may be a single or multipath hydrostatic transmission including at least one pump and at least one fluid motor that are fluidly coupled, with the pump being configured to convert rotational motion of power source 14 into fluid flow, and the fluid motor converting the fluid flow back into rotational motion that is used to drive traction assembly 18. During back driving, motion of traction assembly 18 may be converted by the fluid motor into fluid flow, the fluid flow may be used to drive the pump, and the pump may convert the fluid flow into rotational motion of power source 14. Traction assembly 18 includes at least one traction device, such as a wheel, track, or any other suitable traction device known in the art.

Machine 10 also includes one or more sensors 34. Sensors 34 may be located throughout machine 10, and may provide information related to machine 10. In one embodiment, sensors 34 are operable to monitor operator interface 22, power source 14, transmission assembly 16, traction assembly 18, implement assembly 20, as well as other machine components known to persons skilled in the art, and provide signals. Sensors 34 may provide signals indicative of and/or used to calculate operating parameters related to transmission assembly 16, including transmission assembly torque (i.e., actual torque being used by transmission assembly 16). Sensors 34 may also be operable to provide signals indicative of operating parameters related to power source 14, including, for example, power source speed. It is also contemplated that sensors 34 may provide signals indicative of the position of acceleration pedal 28 to provide data for determining a requested transmission assembly torque and a requested power source speed. The signals may be in the form of digital, analog, mechanical, and/or hydraulic signals.

Machine 10 also includes a control system 36 operatively coupled to operator station 12, power source 14, transmission assembly 16, traction assembly 18, implement assembly 20, and/or sensors 34. Control system 36 may include one or more processors, microprocessors, central processing units, on-board computers, electronic control modules, and/or any other computing and control devices known to those skilled in the art. Control system 36 may run one or more software programs or applications stored in a memory location, read from a computer readable medium, and/or accessed from an external device operatively coupled to the control system 36 by any suitable communications network.

Control system 36 is configured to help the operator control operation of machine components. Control system 36 is operable to control power source 14 by supplying control signals to power source 14 that may inform power source 14 of an oncoming load, and instruct power source 14 to prepare for the oncoming load. For example, control system 36 may supply control signals to power source 14 that may affect the timing and/or quantity of fuel in or received by power source 14, and/or consumed by power source 14. The control signals may be in the form of digital, analog, mechanical, and/or hydraulic signals. Control system 36 may, for example, initiate a supply of fuel to power source 14 in conditions where governor 24 may not initiate supplying of fuel.

By controlling fueling of power source 14, control system 36 may help to ensure that power source 14 does not stall when traction assembly 18, implement assembly 20, and/or any other part of machine 10, encounters a grade, obstacle, pile, and/or any other load. For example, during operation of machine 10, the operator may want to increase a speed of machine 10. The operator may manipulate acceleration pedal 28 by, for example, exerting pressure, which may increase a speed of power source 14. Where acceleration pedal 28 is positioned indicates the power source speed requested by the operator. As the power source speed increases, power source 14 may generate additional power that can be transferred to traction assembly 18 through transmission assembly 16, to speed up traction assembly 18.

In order to decrease the machine speed, the operator may release pressure from acceleration pedal 28, allowing acceleration pedal 28 to return toward a more neutral position. Power source 14 may decelerate, and thus, machine 10 may decelerate. The actual power source speed, however, may not decrease as quickly as the requested power source speed. For example, while the requested power source speed falls almost instantaneously from 1800 rpm to 800 rpm when the operator releases acceleration pedal 28, the power source speed may hold at around 1400 rpm for a period of time, and then afterwards, decrease at a relatively slow rate. This is because during deceleration, traction assembly 18 and/or implement assembly 20, through transmission assembly 16, may back drive power source 14, thus hindering the decrease in the actual power source speed toward the requested power source speed. That is, traction assembly 18 and/or implement assembly 20 may provide power to power source 14 through transmission assembly 16, thus increasing the actual power source speed or preventing the actual power source speed from falling as quickly as the requested power source speed, where the requested power source speed may be determined based on a position of acceleration pedal 28.

If governor 24 determines that the actual power source speed minus the requested power source speed is greater than a predetermined value, governor 24 may put power source 14 in the zero fuel condition. This may occur because governor 24 may try to reduce the difference between the actual and requested power source speeds by cutting the fuel supply to power source 14, in an attempt to drive down the actual power source speed. The zero fuel condition is a potential stall condition for power source 14. That is, if machine 10 encounters a load in the zero fuel condition, power source 14 could stall. As explained below, control system 36 takes action to help ensure that power source 14 does not stall under such conditions.

Figure 4:
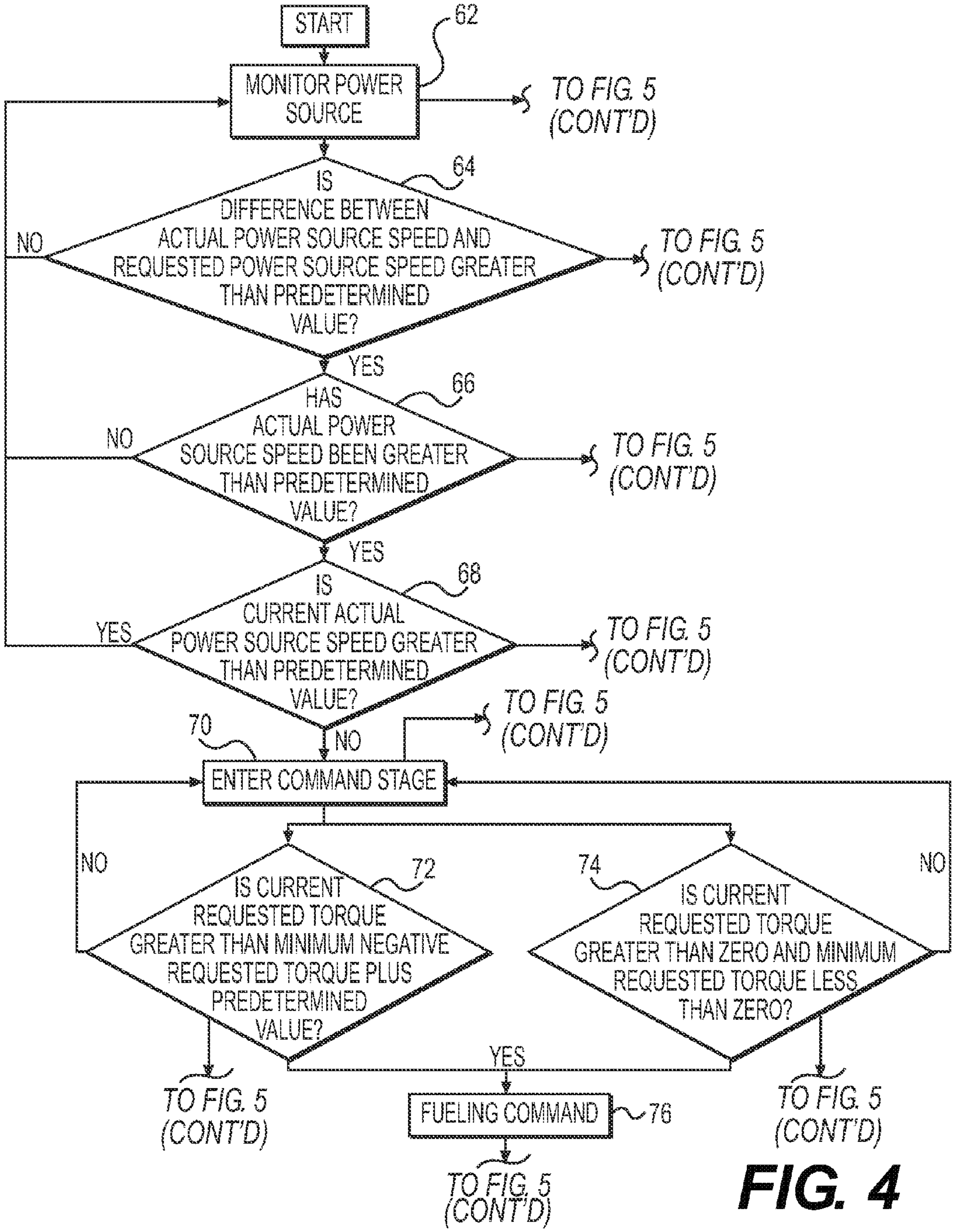
FIGS. 4 and 5 are a flow diagram of a method for feed-forward control according to one aspect of the present disclosure.
Figure 5:
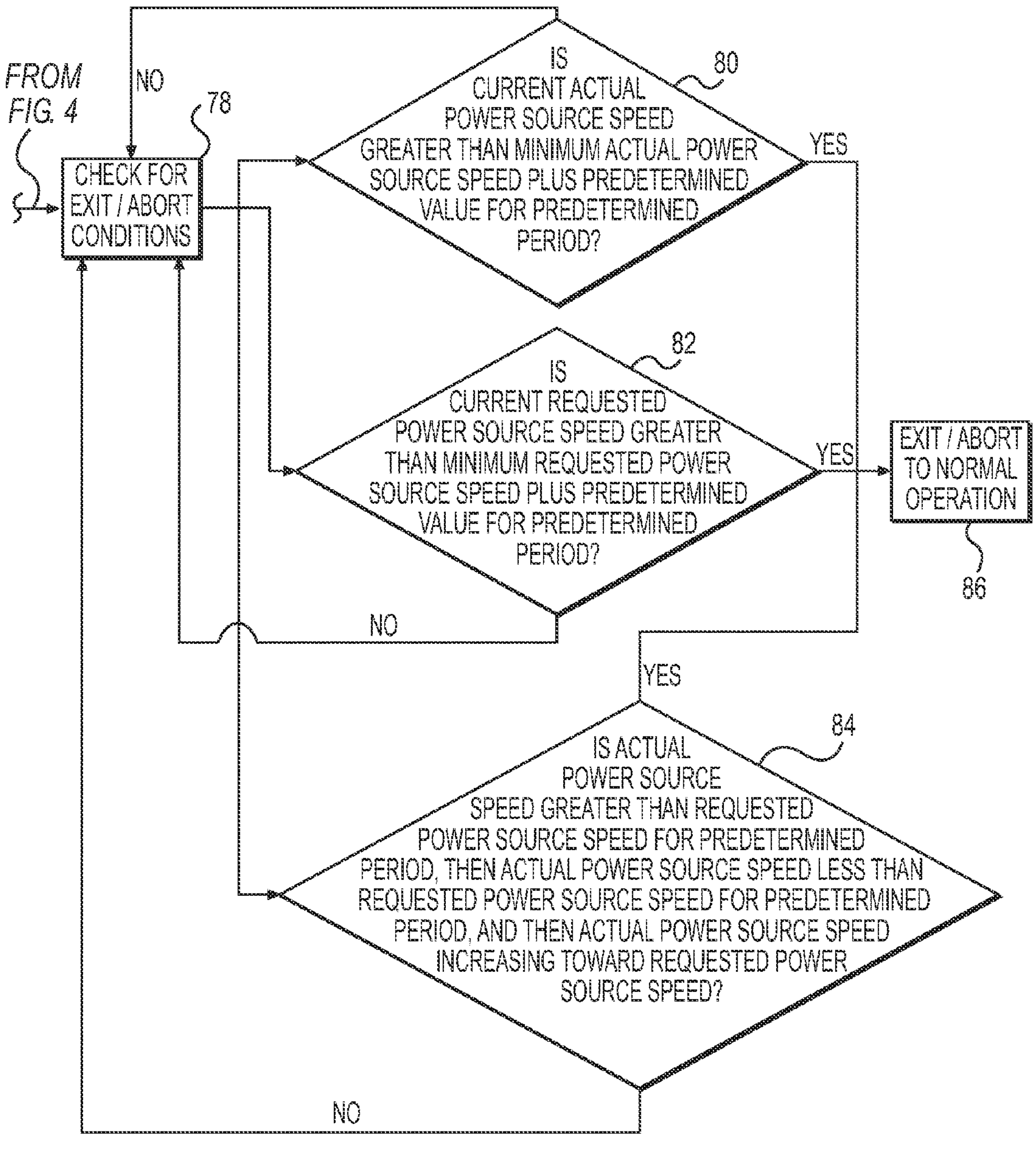

Referring to FIGS. 4 and 5, the action that control system 36 takes may have three stages: a monitoring stage, a command stage, and an exit stage. During the monitoring stage, control system 36 may monitor power source 14 (step 62). Control system 36 may determine if watch conditions are met. One of the watch conditions is whether a difference between the actual power source speed and the desired or requested power source speed is greater than a predetermined value. If the actual power source speed minus the requested power source speed is greater than the predetermined value (step 64), this indicates that traction assembly 18 and/or implement assembly 20, through transmission assembly 16, may be back driving power source 14. Control system 36 may recognize that a risk exists that power source 14 will stall when encountering a load because power source 14 is likely in a zero fuel condition.

Another watch condition is whether the actual power source speed has reached a predetermined value (step 66), such as a minimum speed of 1200 rpm, at any time during a period of time. This watch condition is set so that entry into the command stage does not occur at undesirable times, such as during machine starting conditions and power source throttling. Yet another watch condition control system 36 may be looking for is whether the actual power source speed is currently greater than a predetermined value (step 68), such as 1350 rpm. This watch condition is set so that entry into the command stage doesn't occur if the power source speed is above a speed corresponding to peak torque. Peak torque is a maximum torque or torque limit that power source 14 can produce, and is achieved at a corresponding power source speed. After the torque peaks, it will decrease with increasing power source speed. If the power source speed exceeds the speed corresponding to peak torque, and a load is applied to power source 14, the speed of power source 14 may decrease. The decrease in the power source speed brings the power source speed to a speed that is closer to or at the speed value corresponding to peak torque. As such, power source 14 may produce more torque as the power source speed decreases, and that torque can be used to deal with the oncoming load without resorting to command stage operations. The watch conditions act as a safeguard to prevent control system 36 from entering the command stage at inappropriate or undesirable times. The exact values provided here are exemplary only and may change depending on the characteristics of the machine, type of fuel being used, the work environment, and/or due to other characteristics.

If all three watch conditions are met, control system 36 may enter the command stage (step 70). Until the watch conditions are met, control system 36 may be in a "normal" or governor-controlled state of operation. However, once all three watch conditions are met, control system 36 may enter the command stage where fuel supply to power source 14 may be affected by more than just governor 24.

During the command stage, control system 36 may determine requested transmission assembly torque values. The requested transmission assembly torque is indicative of an amount of torque the operator wants delivered to transmission assembly 16, and may be determined by control system 36 based on the position of acceleration pedal 28. For example, the position of acceleration pedal 28 may correspond to a requested power source speed. Power source speeds may have corresponding power source torque values (i.e., torque values that power source 14 can produce at various power source speeds). Together, the power source speed values and power source torque values may form a speed-torque curve, as would be apparent to one skilled in the art. The requested transmission assembly torque may be the power source torque value corresponding to the requested power source speed on the speed-torque curve.

Control system 36 will determine that a first command stage condition is met if the current requested transmission assembly torque is greater than the sum of a minimum negative requested transmission assembly torque and a predetermined value (step 72). The requested transmission assembly torque is negative when the operator decelerates machine 10, allowing power source 14 to be back driven by traction assembly 18. If the first condition is met, the current requested transmission assembly torque has increased sufficiently from a minimum value during a current session or period of time to indicate that a load is coming on.

Control system 36 will determine that a second command stage condition is met if the current requested transmission assembly torque is greater than zero and the minimum requested transmission assembly torque (for the current session or period of time or operation) is less than zero (step 74). This indicates that transmission assembly 16 was previously decelerating (indicative of a negative requested torque or back driving of power source 14) and now wants to consume torque from power source 14.

The first and second conditions are early indicators that a load is coming on. Thus, if either of the first and second conditions of the command stage are met, control system 36 will issue a fire command (step 76). The fire command may be a command for an amount of fuel to be supplied to power source 14 and/or consumed by power source 14. The fuel is supplied regardless of whether machine 10 has actually encountered a load that is significant enough to cause power source 14 to stall. By supplying the fuel upon meeting either of the two conditions, control system 36 may ensure that if the conditions experienced by machine 10 are actually being caused due to machine 10 encountering a significant load, fuel will have been supplied to and/or injected in power source 14 in time such that power source 14 does not remain in a zero fuel state until the load causes power source 14 to stall.

Figure 6:
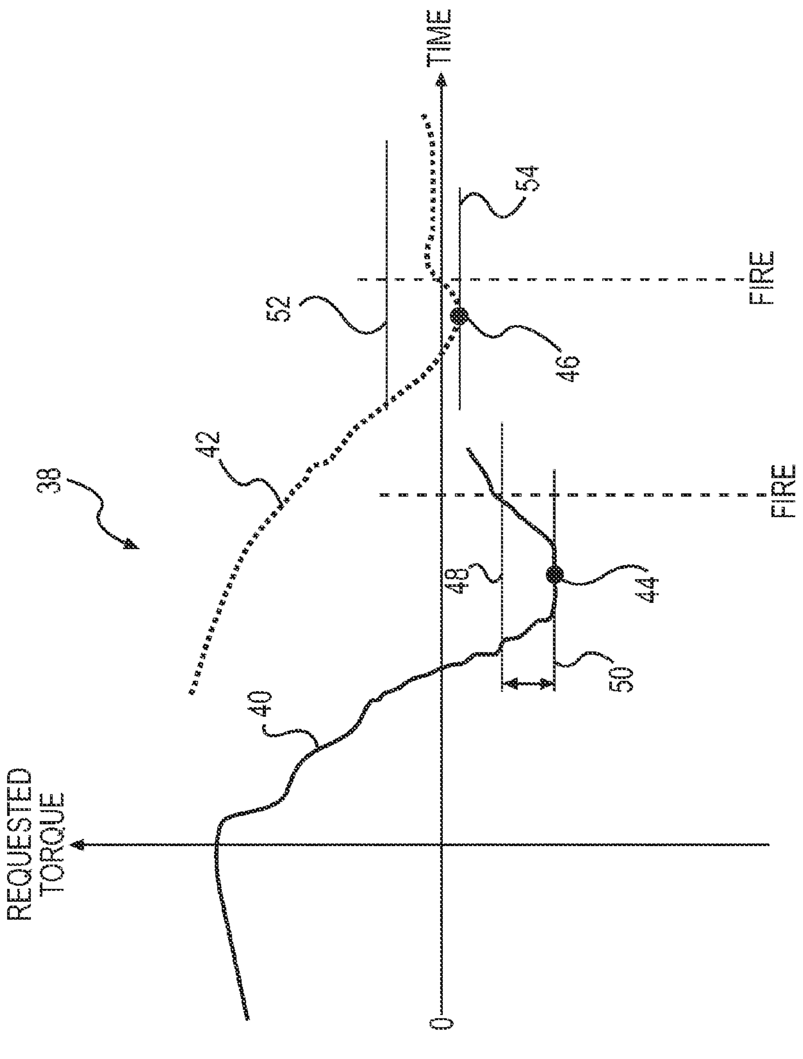
FIG. 6 is a graph with curves representative of transmission assembly torque over a period of time according to one aspect of the disclosure.

The first and second command conditions are shown in graph 38 of FIG. 6, where curve 40 corresponds to the first command condition, and curve 42 corresponds to the second command condition. It should be understood that only one curve would actually exist for a given operation, and that the two curves 40 and 42 are shown together on one graph for ease of comparison. Points 44 and 46 correspond to minimum requested torques, and lines 48, 50, 52, and 54 correspond to the predetermined value added to the minimum requested transmission assembly torque for the first command condition.

The curves 40 and 42 show similarities in the requirements of the first and second command conditions that trigger the fire command. For example, in both of curves 40 and 42, the requested transmission assembly torque is increasing, indicating that a load is coming on, thus resulting in a fire command.

The curves 40 and 42 also show differences in the requirements of the first and second command conditions. With respect to curve 40, a decreasing positive portion of the curve is indicative of the operator releasing pressure from acceleration pedal 28. Where curve 40 crosses the x-axis and becomes negative is indicative of back driving of power source 14 by transmission assembly 16. Curve 40 hits a low point at minimum negative requested transmission assembly torque 44. Line 50 runs through minimum negative requested assembly torque 44. Line 48 is offset from line 50 by a predetermined value. The rising portion of curve 40 toward the right of minimum negative requested assembly torque 44 is indicative of a decrease in the back driving of power source 40. As shown, if the requested transmission assembly torque is greater than the sum of minimum negative requested transmission assembly torque 44 and the predetermined value (the sum value represented by line 48), control system 36 will determine that the first command stage condition is met, and will issue a fire command. This is because if the requested transmission assembly torque has increased sufficiently from a minimum value during a current session or period of time to indicate that a load may be coming on, fuel should be supplied to power source 14 to prevent power source 14 from stalling when the load actually comes on to machine 10, since back driving of power source 14 may not be able to supply enough power to prevent a stall.

With respect to curve 42, a decreasing positive portion of the curve is indicative of the operator releasing pressure from acceleration pedal 28. Where curve 42 crosses the x-axis and becomes negative is indicative of back driving of power source 14 by transmission assembly 16. Curve 42 hits a low point at minimum negative requested transmission assembly torque 46. Line 54 runs through minimum negative requested transmission assembly torque 46. Where curve 42 crosses the x-axis and becomes positive again is indicative of power source 14 driving transmission assembly 16. Line 52 is offset from line 54 by a predetermined value. As shown, if the requested transmission assembly torque is greater than zero and the minimum requested transmission assembly torque 46 is less than zero, it indicates that transmission assembly 16 was previously decelerating quickly (indicative of a negative requested torque or back driving of power source 14) and now wants to consume torque from power source 14. As such, control system 36 will determine that the second command stage condition is met, and will issue a fire command although the requested transmission assembly torque is not greater than the sum of the minimum negative requested transmission assembly torque 46 and the predetermined value (the sum value represented by line 52).

The amount of fuel supplied with the fire command, and/or the rate of fuel supply due to the fire command, may be selected by control system 36 based on which of the two command conditions are met, the magnitudes of the above-described transmission assembly torque values, the rate of change of the above-described transmission assembly torque values over a period of time, and/or any other suitable factors. It is also contemplated that the amount of fuel supplied and/or the rate of fuel supply due to the fire command may be selected based on a look-up table or map listing amounts and/or rates for a variety of conditions. It is further contemplated that the amount and/or rate may be set by a manufacturer or machine operator, and may remain substantially constant.

Control system 36 may remain in the command stage until exiting back to the monitoring stage via the exit stage. During any of the steps outlined above, control system 36 may check for exit or abort conditions (step 78). Control system 36 enters the exit stage from the command stage when any of three conditions are met. One condition is met if the actual power source speed is greater than a minimum actual power source speed plus a predetermined value or tolerance, for the current session or a predetermined period of time (step 80). This condition indicates that a fire command occurred when it should not have occurred (which caused the actual power source speed to increase), that power source 14 is being back driven by another machine component, and/or that back driving of power source 14 has increased in magnitude. In order to prevent further power source speed overshoot, control system 36 immediately stops firing and exits from the command stage.

Another exit condition is met if the current requested power source speed is greater than a minimum requested power source speed plus a predetermined value or tolerance, for a predetermined period of time (step 82). This condition indicates that the operator has depressed accelerator pedal 28, and power source 14 should begin supplying fuel to power source 14 by normal governor control. As such, control system 36 should not add to the increase in power source speed, so control system 36 stops firing and exits from the command stage.

Figure 7:
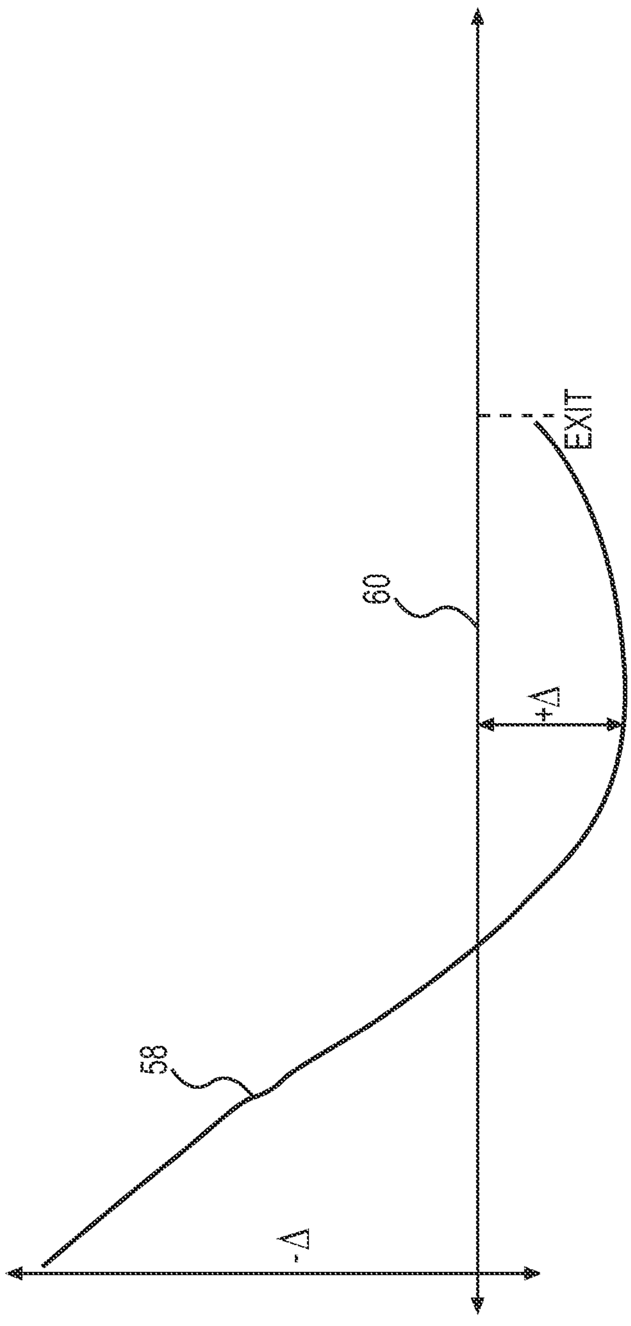
FIG. 7 is a graph with a curve representative of requested engine speed over a period of time according to one aspect of the disclosure.

Yet another exit condition is if the actual power source speed is greater than the requested power source speed for a period of time, then the actual power source speed is less than the requested power source speed for a period of time, and then the actual power source speed increases to approach the requested power source speed (step 84). If this occurs, control system 36 will exit the command stage before the actual power source speed reaches the requested power source speed (i.e., when the requested power source speed minus the actual power source speed reaches a predetermined value). This condition indicates that a fire command was successfully executed during the command stage. A curve 58 of the actual power source speed relative to the requested power source speed 60, when the fire command has been successfully executed, is shown in FIG. 7.

When any of the three exit/abort conditions are met, the exit stage is completed and control system 36 will exit from the command stage (step 86), and may return to the monitoring stage. The above-outlined steps may be repeatedly carried out during machine operation.

INDUSTRIAL APPLICABILITY

The disclosed control system 36 may have applicability in machines, such as machine 10, and may have may have particular applicability in machines including a power source 14 and a transmission assembly 16. During operation of a machine 10, in order to decrease the speed of machine 10, the operator may release pressure from an acceleration pedal 28. Power source 14 may decelerate, and thus, machine 10 may decelerate. A traction assembly 18 of machine 10, through transmission assembly 16, may back drive power source 14, thus hindering the decrease in the actual power source speed toward the requested power source speed. Under such conditions, a governor 24 may put power source 14 in a zero fuel state, increasing the risk of power source 14 stalling upon encountering a load.

Control system 36 may take action to help ensure that power source 14 does not stall under such conditions. Control system 36 may monitor for the existence of conditions that are early indicators that a load is coming on. When conditions indicate that a load is coming on, control system 36 will issue a command for an increase in fuel supply to power source 14. Thus, control system 36 may ensure that if the conditions experienced by machine 10 are actually being caused due to machine 10 encountering a significant load, fuel will have been supplied to and/or injected in power source 14 in time such that power source 14 does not remain in a zero fuel state until the load causes power source 14 to stall. Reducing the likelihood of stalling may enhance machine performance and reliability.

What is claimed is:

1. A control system for a machine, comprising:

a processor configured to communicate with:

a power source, and a transmission assembly;

the processor being configured to:

determine whether the power source is in a potential stall condition based at least in part on an actual speed of the power source and a requested speed of the power source, and if the power source is in the potential stall condition, request that fuel be supplied to the power source although the fuel is not currently required by the power source, in anticipation of an increase in load on the machine.

2. The control system of claim 1, wherein the potential stall condition is a governor controlled zero fuel condition.

3. The control system of claim 1, wherein the processor is configured to determine whether the power source is in the potential stall condition based on whether a difference between the actual power source speed and the requested power source speed is greater than a predetermined value.

4. The control system of claim 3, wherein the difference being greater than the predetermined value indicates that the power source is being driven by the transmission assembly.

5. The control system of claim 1, further including determining whether a current requested transmission assembly torque exceeds a minimum requested transmission assembly torque by a predetermined value, and if so requesting that fuel be supplied to the power source.

6. The control system of claim 1, further including determining whether a current requested transmission assembly torque is greater than zero and a minimum requested transmission assembly torque is less than zero, and if so requesting that fuel be supplied to the power source.

7. The control system of claim 1, wherein the request that fuel be supplied occurs before an increase in load on the machine causes the load to exceed power available from the power source.

8. A method for controlling a machine including a power source and a transmission assembly, the method comprising:

determining whether the power source is in a potential stall condition based on an actual speed of the power source and a requested speed of the power source;

when the power source is in a potential stall condition, determining whether a requested transmission assembly torque is increasing; and informing the power source that a load is coming based at least in part on the requested transmission assembly torque to prepare the power source for the oncoming load, in anticipation of the oncoming load.

9. The method of claim 8, wherein the potential stall condition is a governor controlled zero fuel condition.

10. The method of claim 8, wherein determining whether the power source is in the potential stall condition based on the actual power source speed and the requested power source speed includes determining whether a difference between the actual power source speed and the requested power source speed is greater than a predetermined value.

11. The method of claim 10, wherein the difference being greater than the predetermined value indicates that the power source is being driven by the transmission assembly.

12. The method of claim 8, wherein determining whether the requested transmission assembly torque is increasing includes determining whether a current requested transmission assembly torque exceeds a minimum requested transmission assembly torque by a predetermined value, and if so, requesting that fuel be supplied to the power source to prepare the power source for the oncoming load.

13. The method of claim 12, wherein requesting that fuel be supplied includes requesting that fuel be supplied before an increase in load and the potential stall condition causes the power source to stall.

14. The method of claim 8, wherein determining whether the requested transmission assembly torque is increasing includes determining whether a current requested transmission assembly torque is greater than zero and a minimum requested transmission assembly torque is less than zero, and if so, requesting an increase in fuel supply for the power source to prepare the power source for the oncoming load.

15. A machine comprising:

a power source;

a governor configured to control power source fueling based on an actual speed of the power source and a requested speed of the power source;

a transmission assembly operatively coupled to the power source; and a control system operatively coupled to the power source and the transmission assembly, the control system being configured to:

determine whether the power source is in a potential stall condition due to a response of the governor to a difference between the actual power source speed and the requested power source speed, and request that fuel be supplied to the power source to remedy the potential stall condition in anticipation of an increase in load on the machine.

16. The machine of claim 15, wherein the potential stall condition is a governor controlled zero fuel condition.

17. The machine of claim 15, wherein the governor is configured to increase power source fueling when the actual power source speed is less than the requested power source speed, and to decrease power source fueling when the actual power source speed is greater than the requested power source speed.

18. The machine of claim 15, wherein the control system is configured to determine whether the power source is in the potential stall condition when the difference between the actual power source speed and the requested power source speed exceeds a predetermined value.

19. The machine of claim 15, wherein the control system is configured to determine whether a current requested transmission assembly torque is greater than a minimum requested transmission assembly torque plus a predetermined value, and if so, request that fuel be supplied to the power source.

20. The machine of claim 15, wherein the control system is configured to determine whether a current requested transmission assembly torque is greater than zero and a minimum requested transmission assembly torque is less than zero, and if so, request that fuel be supplied to the power source.

* * * * *